United States Patent
Amacker et al.

(10) Patent No.: US 9,619,713 B2
(45) Date of Patent: *Apr. 11, 2017

(54) TECHNIQUES FOR GROUPING IMAGES

(71) Applicants: A9.com, Inc., Palo Alto, CA (US); Amazon Technologies, Inc., Reno, NV (US)

(72) Inventors: Matthew W. Amacker, Santa Clara, CA (US); Joel D. Tesler, Cupertino, CA (US); Piragash Velummylum, Seattle, WA (US)

(73) Assignees: A9.com, Inc, Palo Alto, CA (US); Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/986,399

(22) Filed: Dec. 31, 2015

(65) Prior Publication Data

US 2016/0117556 A1    Apr. 28, 2016

Related U.S. Application Data

(63) Continuation of application No. 13/332,266, filed on Dec. 20, 2011, now Pat. No. 9,256,620.

(51) Int. Cl.
*G06K 9/00* (2006.01)
*G06F 17/30* (2006.01)
(Continued)

(52) U.S. Cl.
CPC ....... *G06K 9/00677* (2013.01); *G06F 3/0482* (2013.01); *G06F 3/04842* (2013.01);
(Continued)

(58) Field of Classification Search
CPC .......... G06K 9/00221; G06K 9/00228; G06K 9/00288; G06K 9/00295;
(Continued)

(56) References Cited

U.S. PATENT DOCUMENTS 7,203,367 B2    4/2007    Shniberg et al.
7,881,504 B2    2/2011    Kagaya et al.
(Continued)

OTHER PUBLICATIONS

"Add name tags in Picasa Web Albums," retrieved on Sep. 9, 2011, from http://picasa.google.com/support/bin/answer.py?hl=en&answer=93973, 1 page.
(Continued)

*Primary Examiner* — Andrew W Johns
(74) *Attorney, Agent, or Firm* — Seed IP Law Group LLP (57) ABSTRACT

Techniques for grouping images are disclosed. In some situations, the techniques include identifying at least one event-based image group among a plurality of images based on an event that is associated with each identified image, receiving a selection of one or more objects in a first image of the identified event-based image group, identifying other images in the identified event-based image group that each include at least one of the selected one or more objects, and associating the identified images with the first image. In one instance, the selected objects include individuals captured in the image.

20 Claims, 5 Drawing Sheets

(51) Int. Cl.
*G06F 3/0482* (2013.01)
*G06F 3/0484* (2013.01)

(52) U.S. Cl.
CPC .... *G06F 17/3028* (2013.01); *G06F 17/30277* (2013.01); *G06F 17/30601* (2013.01); *G06K 9/00221* (2013.01)

(58) Field of Classification Search
CPC .... G06K 2009/00328; G06F 17/30256; G06F 17/30259; G06F 17/30265; G06F 17/30268
See application file for complete search history.

(56) References Cited

U.S. PATENT DOCUMENTS

| | | | |
|---|---|---|---|
| 8,495,156 | B2 | 7/2013 | Fletcher |
| 9,256,620 | B2 * | 2/2016 | Amacker et al. . G06F 17/30277 382/118 |
| 2005/0111737 | A1 | 5/2005 | Das et al. |
| 2006/0050934 | A1 | 3/2006 | Asai |
| 2006/0056737 | A1 | 3/2006 | Ohtsuka et al. |
| 2006/0239515 | A1 | 10/2006 | Zhang et al. |
| 2006/0253491 | A1 | 11/2006 | Gokturk et al. |
| 2007/0177805 | A1 | 8/2007 | Gallagher |
| 2007/0206231 | A1 | 9/2007 | Singh |
| 2008/0112621 | A1 | 5/2008 | Gallagher et al. |
| 2008/0130960 | A1 | 6/2008 | Yagnik |
| 2008/0208791 | A1 | 8/2008 | Das et al. |
| 2008/0270613 | A1 | 10/2008 | Bamford et al. |
| 2008/0278438 | A1 | 11/2008 | Brown et al. |
| 2008/0310688 | A1 | 12/2008 | Goldberg |
| 2009/0034805 | A1 | 2/2009 | Perlmutter et al. |
| 2009/0128502 | A1 | 5/2009 | Li et al. |
| 2009/0257663 | A1 | 10/2009 | Luo et al. |
| 2010/0172550 | A1 | 7/2010 | Gilley et al. |
| 2011/0035673 | A1 | 2/2011 | Chou et al. |
| 2011/0038512 | A1 | 2/2011 | Petrou et al. |
| 2011/0267368 | A1 | 11/2011 | Casillas et al. |
| 2012/0052848 | A1 | 3/2012 | Kim |
| 2012/0242840 | A1 | 9/2012 | Nakfour et al. |

OTHER PUBLICATIONS

Screen capture of http://www.apple.com/ilife/iphoto, retrieved on Jan. 30, 2012, 1 page.
Screen capture of http://face.com, retrieved on Sep. 19, 2011, 1 page.
Girgensohn et al., "Simplifying the Management of Large Photo Collections," Proc. Interact 2003, 8 pages.

* cited by examiner

TECHNIQUES FOR GROUPING IMAGES

BACKGROUND

Many mobile computing devices today have the ability to capture an image, such as a photograph, video, and the like. The images may be stored locally on the device or remotely and made accessible by the device. Some image viewing applications available today organize (e.g., group) the captured images by objects in the image, for example, by a person captured in the image. The image grouping is possible only through complicated facial recognition applications. Also, grouping the stored images into separate collections may require a substantial number of manual operations conducted on the device. Image grouping allows a user to view images that contain a specific object, but does not allow easy sharing the images with any one person. The user still has to share (e.g., email, text, post, etc.) the images individually or upload the images to a service that is made accessible to the people that the user intends to share the images with.

DETAILED DESCRIPTION

Techniques are presented for organizing images into a group based on common objects in each image of the group. In a network-based environment (e.g., based upon the Internet), a user may have access to user (client) devices configured to capture images (e.g., photos, videos, and the like) and to enable interaction with other users and to access, view, browse, and store content, including images, textual, and video or audio content. In an embodiment, the captured images may be organized into separate groups of images based on particular common features (e.g., common objects in a plurality of pictures), time and place periods (e.g., pictures taken in one day or in one place or event), and the like. In an embodiment, the common feature(s) used for organizing images into groups may be provided by the user selection of such common features.

For example, suppose a user selects, via their client device (e.g., smart phone), an image for display that the user took of three friends while attending an event. In order to locate other images that include all three persons (either stored locally on the device, another device or remote storage), the user may select each face of a person displayed in the image. By doing so, the device identifies the characteristics of each selected face (e.g., color of hair, color of eyes, etc.) and identifies other images that contain faces with similar characteristics. These other images are grouped together with the initially displayed image and made available for access to the user.

The objects (e.g., faces) in the image selected by the user may be made selectable in a number of different ways. For example, once the objects in the image are identified as particular object type (e.g., the objects are identified as faces), a bounding box may be put around each object so as to make them selectable for a user. Other methods of making objects in the image selectable may also be used. For example, each identified face in the image may be made selectable by a user selection (e.g., a touch). A user may select one or more of the objects in the image in a number of different ways. For example, the user may use a "stylus" for selecting the bounding boxes surrounding selectable objects displayed in an image. In another embodiment, the user may scroll through the selectable objects (e.g., indicated by the bounding boxes) with arrow keys, a track ball and the like of the device. In another embodiment, the selectable objects in an image may be numbered and the user may select one or more of the objects by entering the number on the device keyboard (physical or virtual). In the instance where the client device includes a touch-screen, the user may select one or more of the selectable objects using her finger. Other known methods of selecting objects (e.g., bounding boxes surrounding selectable objects) on the device screen may be used.

In an embodiment, e.g., initial image grouping may occur before the user selection of a particular image or an object in the image. For example, stored images may be organized into initial image groups based on common objects or features captured in the pictures, common time and place periods (e.g., pictures taken in one day or in one place or event), and the like. Accordingly, the initial image groups may be based on a particular event that took place over a determined period of time and/or at a particular location. The initial image groups will be hereinafter called "event-based" image groups.

The user may select an image within one of the event-based image group and select one or more objects in the image. The distinct features of each selected object may be identified, and the other images with the same or similar distinct features within the event-based image group may be identified and presented to the user. For example, if the user selects two objects in the image, the images in the event-based image group may be identified that have both objects selected by the user. In another example, the images in the event-based image group may be identified that have at least one of the two objects, i.e., either the first or the second selected object, and the resulting group may be presented to the user. The distinct features of each selected object may be identified as any feature-rich areas of the object that are distinct from other portions of the object.

Grouping images may be used for a variety of actions associated with the image group. In an embodiment, selected objects in the image (e.g., faces, buildings, etc.) identified by the image grouping application may be associated with information related to the identified object. In an embodiment, the user-selected faces in one or more images, once identified, may be associated with the identified user's data, such as telephone numbers, email addresses, and/or other user information. The association may be accomplished by using information already available on the device (e.g., a stored address book or contact list for a communication program) and/or by pulling the identified users' information from known content resources, such as social networking Web sites. Information retrieved from an external source may be stored on a client device and be used instead of, or in addition to, a "list of contacts" that users typically have to create manually. Once a group of images is created, a user may, by way of example only, email the images to designated recipients (e.g., as selected from one of the pictures), store the images to a photo album to enable later retrieval, and the like.

Figure 1:
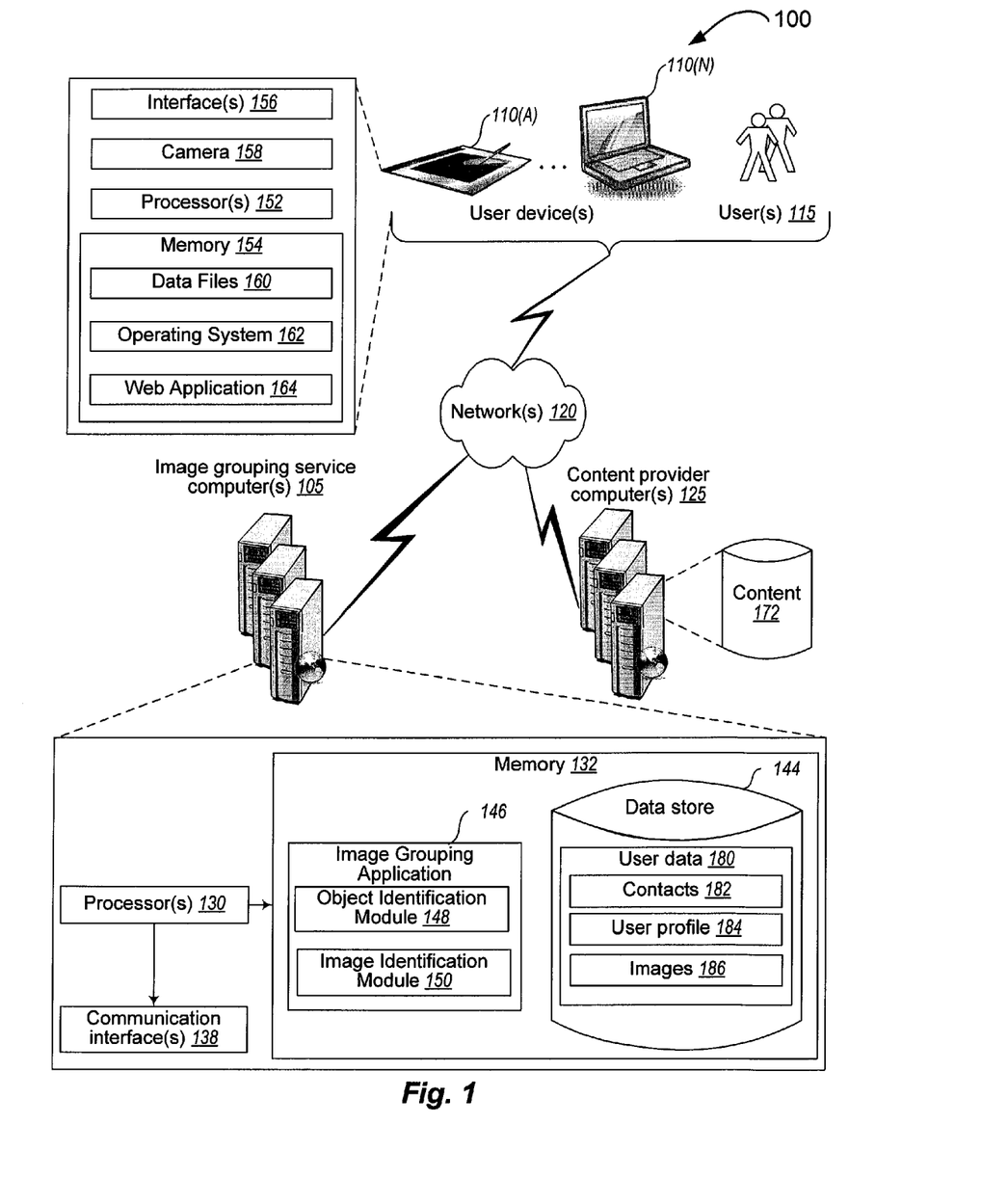
FIG. 1 illustrates an environment in which various embodiments may be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes one or more electronic client (user) devices 110(A)-110(N), which can include any appropriate device operable to send and receive requests, messages, or information over an appropriate network 120 and convey information back to a user 115 of the device. Examples of such client devices include personal computers, cell phones, handheld messaging devices, laptop computers, set-top boxes, personal data assistants, tablet PCs, and the like. The client devices 110(A)-110(N) may include a processor 152 and memory 154 for storing processor-executable instructions, such as data files 160, operating system 162, and one or more web applications 164. The devices may further include at least one or more of the following elements: input/output, user and communication interfaces 156. The client devices 110(A)-110(N) may be equipped with an image capture device (e.g., a camera) 158. The user interface 156 may include a display or a screen such as touch screen on which the stored images may be displayed and a request for an image selection or object in the image selection may be received.

The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes one or more Web servers (content provider computers) 125 for receiving requests and serving content in response thereto, although for other networks, an alternative device serving a similar purpose could be used, as would be apparent to one of ordinary skill in the art.

The illustrative environment 100 includes at least one application server (e.g., image grouping server) 105 including, or associated with, one or more processors 130 that may be connected to a communication interface 138 and memory 132. The memory 132 may include, but is not limited to, image grouping application module 146. The image grouping application module 146 may include an object identification module 148 storing processor-executable instructions for enabling object selection in images and for identifying characteristics of the selected objects. The image grouping application module 146 may further include an image identification module 150 storing processor-executable instructions for identifying images having objects with similar characteristics to those selected by the user. In one embodiment, the image grouping application module may reside and/or execute on the client device 110(A)-110(N).

The memory 132 may include a data store 144. The data store 144 may store at least user data 180 including, but not limited to, user profile 184, image store 186 and user contacts 182 associated with the user. In an embodiment, the user profile 184 may include user's email address, location information, and other attributes specific to the user. The user profile may contain information about client devices associated with the user (e.g., device ID). The user contacts 182 may include information associated with contacts associated with the user, for example, telephone numbers and email addresses of the user's contacts. The image store 186 may contain a collection of images captured or otherwise assembled by the user, for example, with the camera 158 of the client device 110(A)-110(N). In one embodiment, information stored in the data store 144 may reside, at least in part, or be accessible by, the client device 110(A)-110(N).

The image grouping application 146 may be configured, when executed, to receive a user selection of one or more objects in a user-selected image of a plurality of images stored in image store 186 and accessible by the client device 110(A)-110(N). The images may be also stored on the user device 110(A)-110(N) and be accessible by the application server 105 (e.g., image grouping application 146). The image grouping application may identify characteristics of the selected objects, browse the stored images, and determine the images having the objects with identified characteristics. The application may then tag the identified images and made the images available to the client device 110(A)-110(N) as an image group, which may then be provided to the user for further action. Further actions, such as sharing the image group with other users (e.g., posting the group on a Web site or emailing the group to the selected users) may then be performed. The actions may further include sending permissions to view the group of images by the users captured in the images, creating an album based on the group of images, setting up for regular transmissions to the users captured in the images (if objects in the images are persons), associating faces in the group of images with the respective user information, providing user location to the users captured in the images, and the like. In one example, the image grouping application may reside on the client device 110(A)-110(N).

It should be understood that there can be several application servers, layers, or other elements, processes, or components, which may be chained or otherwise configured, which can perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example.

The handling of requests and responses between client devices 110(A)-110(N) and content providers, as well as the delivery of content 172 (e.g., Web sites) to client devices 110(A)-110(N) can be handled by the content provider computer server(s) 125. Content provider computer server(s) may include an operating system that provides executable program instructions for the general administration and operation of that server, and may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 144 can include several separate data tables, databases, or other data storage mechanisms and media for storing data relating to a particular aspect. For example, the data store illustrated includes mechanisms for storing production data and user information. The data store may include a mechanism for storing communication log data, which can be used for reporting, generating recipient groups, updating recipient groups, and other such purposes. It should be understood that there can be many other aspects that may need to be stored in the data store, such as page image information and access right information, which can be stored in any of the above-listed mechanisms as appropriate or in additional mechanisms in the data store 144.

The environment described herein is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limited to the scope of the disclosure.

Figure 2:
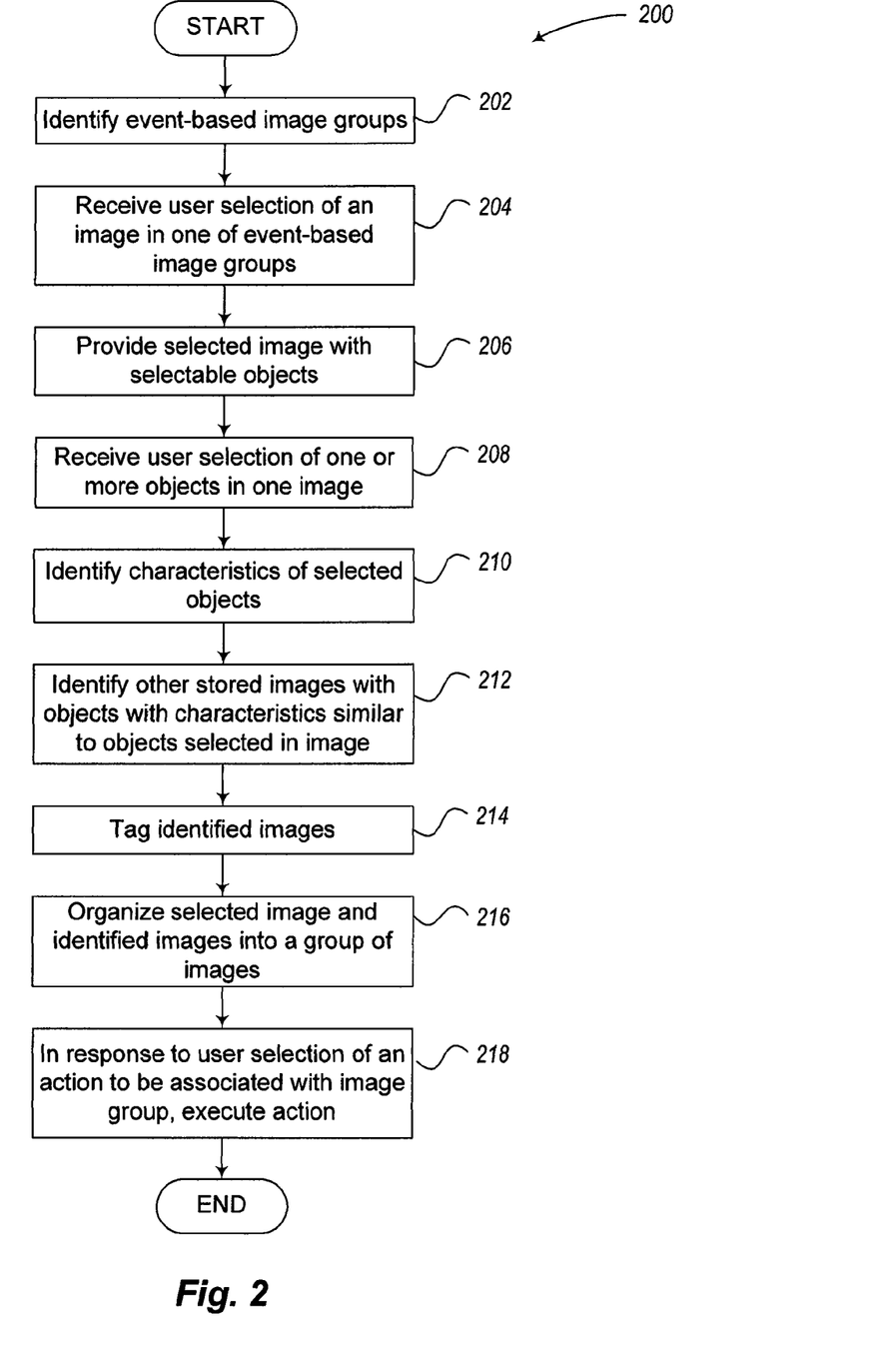
FIG. 2 is a process flow diagram for making a group of images available to the user for viewing and/or sharing based on one or more objects selected in an initial image in accordance with an embodiment.

FIG. 2 is a process flow diagram for making a group of images available to the user for viewing and/or sharing based on one or more objects selected in an initial image in accordance with an embodiment. The process 200 begins with block 202, where images stored, for example, on a user device, are grouped into event-based image groups. In one example, the grouping may be initiated by the user and occur in response to a user request. Event-based grouping is based on the assumption that pictures taken over a determined period of time (e.g., a few hours) and/or at a particular location are likely to be associated with a particular event that took place over the determined period of time at one location. Furthermore, there likely to be time and/or location gaps between groups of images taken during a short period of time at one location. For example, a first set of pictures may be taken in one day (e.g., within a few minutes of each other), and a second set of pictures may be taken on the next day (after, for example, a 12-hour gap between the last picture of the first set and the first picture of the second set). Thus, close times of picture-taking and time (and/or location) gaps between taking different pictures sets may be used for event-based image grouping. Some user devices, e.g., cameras and mobile phones (e.g., smart phones) have a capability for tagging captured images (photographs) with the latitude and longitude coordinates of a spot where the photographs were taken, and this information may be used to identify the location of where the images were taken.

Accordingly, the adjacent in time images or images having the same or similar (within a determined margin) geographical characteristics (e.g., latitude/longitude coordinates) may be identified in order to identify images that are likely to constitute a common group as the images may have been taken at the same (or around the same) location. For example, time stamps in each stored image may be reviewed to determine that the images were taken close in time (e.g., within one day) because the probability of the same objects being in the images taken within a short period of time is higher than the probability of the same objects being in the images taken within a longer period of time (e.g., one week).

In another example, a user may control event-based image grouping by requesting that the event-based grouping occurs for the user-provided time periods and/or location coordinates. The user may also finalize the event-based grouping as desired. For example, if six event-based image groups are identified (e.g., for each day of a week-long vacation), the user may form a seventh event-based group (a week-long vacation event-based image group) based on the six image groups already identified by the system. The event based image group may be associated (e.g., tagged) with a name of event or time of event, for example, "Wedding pictures." The event-based group-event tag association may be provided by the user or created by the system. It is to be understood that the event-based image group does not have to be stored on the client device; it may be stored in different data stores maintained by third parties and accessible by the device remotely.

At block 204, a selection of an image in an event-based group is received. For example, a user, via their client device, may view images maintained by a third-party service via a browser. In another example, a user may view images stored locally on the client device. Regardless of where the images are stored, the user may select an image by using her finger (if the client device has a touch sensitive display), selecting an image with a mouse click, tapping the image with a stylus, highlighting an image by using controls on a keyboard, entering a number associated with the image, and the like. Each image may have multiple objects, such as faces of different people.

At block 206, the selected image may be provided with selectable objects. Continuing with the example photo of three friends at an event, the image may be displayed to the user with a bounding box associated with the faces of each of the three friends. The bounding box may be displayed around each face in the image once facial areas in the image are identified. In another example, a user may draw a bounding box put around an object in the image (e.g., face) and use the bounding box for selection of the object. Different methods of making objects in the image selectable may be used. For example, the facial areas, once identified, may be made selectable without providing bounding boxes around the facial areas. Facial recognition technology for identifying faces or other objects within an image and making objects in the image selectable by, for example, providing a bounding box associated with each object is known in the imaging art. Thus, a more detailed description is not provided herein. In one instance, each bounding box displayed in the image is selectable (for example, as shown in FIG. 4B). Objects identified within an image are not limited to people's faces. Other objects that may be identified within an image may include, for example, buildings, signs, animals, cars and the like.

At block 208, a selection of one or more objects (by, for example, selecting the bounding box) in the image is received. As discussed above, there are many ways for selecting an object within an image. For example, the user may touch the object itself or bounding box surrounding the object if the client device has a touch sensitive screen.

At block 210, the characteristics of the selected objects in the image may be identified. For example, the object separated from the background may be analyzed and features associated with the object (e.g., color, texture, and the like) may be identified. Generally, the object characteristics, such as distinct features of each selected object may be identified as any feature-rich areas of the object that are distinct from other portions of the object. For example, if a selected object in the image is a person, a distinct feature identifying that person may be a particular piece of clothing (e.g., a belt buckle, a tie, a hat, a brooch, and the like) or a distinct ornament (e.g., a sign on the person's T-shirt, a flower on the dress, and the like). In the example of an object being a face in the image, the characteristics of each facial area within a bounding box (e.g., color of hair, color of eyes, etc.) may be identified. At block 212, images that have objects with characteristics (e.g., distinct features) similar to the objects initially selected by the user (block 208) may be identified. In the example of a selected object being a face in the image, the facial areas in other images may be analyzed to determine whether the characteristics of the other faces (e.g., color of hair, color of eyes, etc.) match or are similar to the characteristics of the initially selected face.

In another example, any distinct features (e.g., a garment article) of the selected object may be identified as object characteristics and objects in other images may be analyzed to determine whether any of the objects contain the same or similar distinct features (e.g., the same garment article). Because the analyzed images belong to the same event-based image group (e.g., an image group of images taken at a wedding, a ceremony, an excursion, and the like), the distinct features used for identification of the images (e.g., garment articles) are unlikely to change during the event. Accordingly, these distinct features may be used for image identification within the same event-based image group.

At block 214, the identified images that contain objects with similar characteristics may be associated with or marked (e.g., tagged) with a common identifier that may be used for further retrieval. Accordingly, at block 216, all images that have all identified objects or at least one identified object (including the image initially selected by the user) may be organized into a group of images based on the common identifier and provided for display.

In some embodiments, grouping images techniques may be used to trigger further action or actions associated with the image group. The actions may be executed automatically or may occur on demand, according to a user request or requests for action. A variety of actions may be executed in association with the image group. For example, the group of images may be printed out according to a request provided by the user. In another example, a communication such as email, text message or the like may be sent out to the users selected in the initial image of the group. For example, permissions to view this group of images may be sent out by the user to all users present in the images of the group. In another example, each of the selected and identified faces in the group of images may be associated with their respective user information, such as telephone numbers, email addresses, and the like, as described below in greater detail. In another example, the selected image group may be uploaded to a Web site. For example, the user, once establishing her credential with the Web site, may provide a pointer to the selected image group (a path or a hyperlink) to the Web site and request that the selected image group be uploaded.

In yet another example, faces in images in the group selected by the user may be associated with their respective email addresses, and users on the "list of contacts" of the user's email service may be equipped with "thumbnail photos" of the respective users according to the user selection. The above described actions should not be construed as limiting; these are but a few examples of actions that may be associated with the groups of images generated at a user request. Accordingly, at block 218, in response to a user selection of an action to be associated with the image group, the action involving an image group may be executed.

Figure 3:
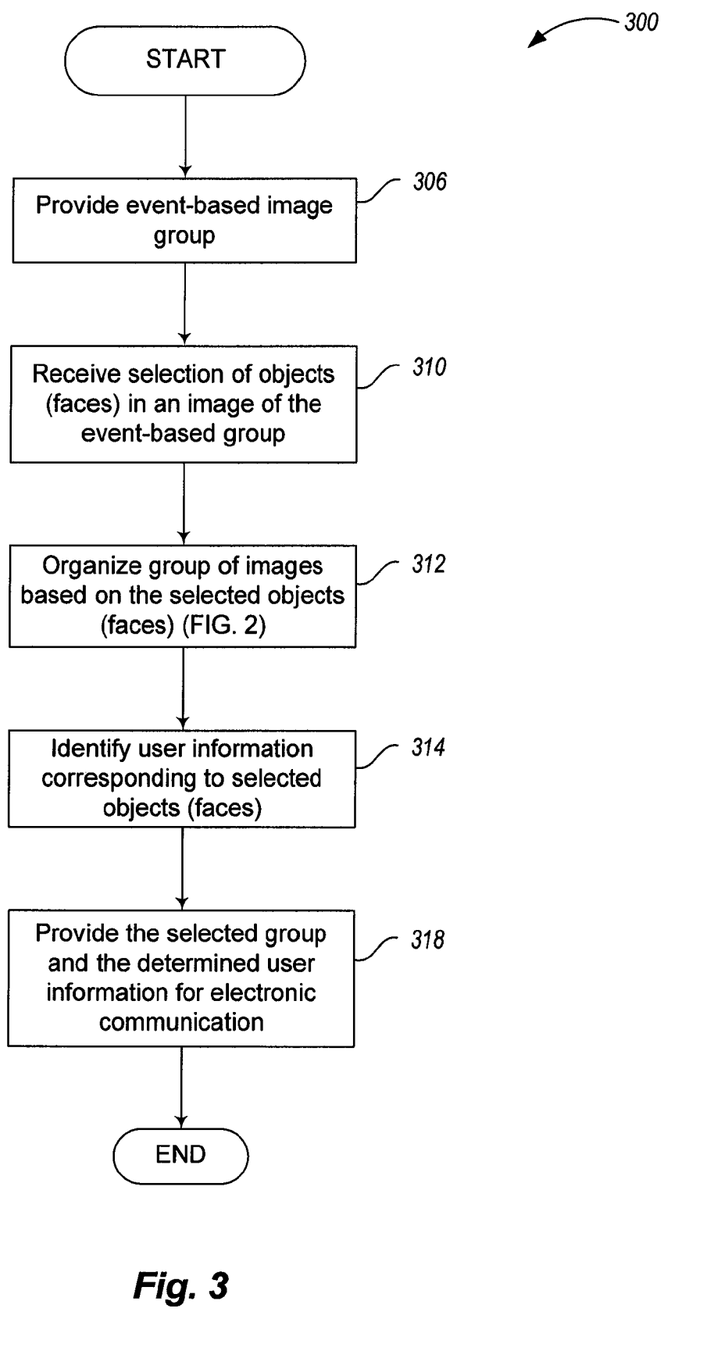
FIG. 3 is a process flow diagram for making a group of images available to the user in accordance with another embodiment.

FIG. 3 is a process flow diagram for making a group of images available to the user in accordance with another embodiment. As described above, the image grouping may be used in a number of different ways for communication with other users, such as for electronic mailing to the other users. For example, the user may select the objects of interest (e.g., faces) in one initial image of an event-based image group and have the images with the selected objects organized into an image group as described in reference to FIG. 2. The selected objects (faces) may be designated as recipients of the user's communication having the image group with the selected objects attached or otherwise associated with the communication. A communication may be any type of electronic communication, including email, instant messaging, text messaging, and the like.

Suppose that the images are grouped together in event-based image groups as described above in reference to FIG. 2. As a result, a user may be able to select an event-based image group of interest based on the group identifier. The process 300 begins at block 306, where in response to a user request for an event based image group, the requested event-based image group is provided on a client device. For example, one image in the event-based image group may be displayed with a title indicating the image group (e.g., a person's name, an even such as a trip or a wedding, and the like.) In response to a user selection of the displayed image, the image group may be provided to the user.

At block 310, the user may select one or more faces in an image of the provided event-based group or simply indicate that all faces in the representative image are selected, as described above in reference to FIG. 2. For example, the user may select a particular picture in the group that has a representative number of faces of participants of the group. The image may be the image with a group identifier (e.g., a title) initially displayed to the user as described in reference to block 306, although it does not have to be. The user may then select the faces with her finger if the image is provided on a touch sensitive screen of a user device. In another example, functionality "select all objects in image" may be provided to the user that would enable the user to select all faces in the image if desired. At block 312, the images of the event-based image group having objects with the selected faces may be identified and grouped into a group of images having one or more of the selected objects in each image as described above in reference to FIG. 2.

At block 314, the user information associated with the selected individuals may be identified. For example, facial characteristics of selected faces may be compared with faces of users in available social networking resources. If selected faces of users are identified using information from social networking Web sites, user-associated information (e.g., information stored with the user profiles) may be retrieved from the social networking Web sites. In another example, once the selected users are identified, email addresses of users identified based on the user selection may be determined and retrieved from the user information associated with the user's communication service (e.g., email service), such as the user's contact list by matching the identified selected users with user information in the contact list.

In another example, the user may manually associate an email address with a person identified in an image. In some instances, selecting a face or person in the representative image may be matched against the user's contact list that has images associated with each contact. In an embodiment, user information may have been associated with the selected individuals previously, if the process described in reference to block 314 occurred in the past with respect to the selected individuals. In that case, the user information associated with the selected individuals may be retrieved and provided for further action (e.g., initiating an electronic communication as described below).

At block 318, the selected group and the determined user information (e.g., email addresses) may be provided for email communication to the user. Accordingly, the user may carry out communications (e.g., email communications) associated with the selected image group. For example, in case of an email communication, the email message based on the selected group may be provided to the user for sending. The email "To" line may be populated (e.g., in response to a user request) with the email addresses of individuals selected by the user and identified as described above. The selected image group may be associated with the email message as an attachment or as a link to the image group. e.g.

In an embodiment, the communications based on the created image groups may be deferred until the user has completed image group selection as described by the process 200. For example, the user may create a first image group based on a first person selected by the user on an image selected from an event-based image group and initiate a first email communication associated with the first image group (e.g., a communication intended for the selected person and including the first image group as an attachment or a hyperlink, for example). The first email communication may be stored temporarily as a "draft email" on a client device or a data store associated with the user's email service and accessible by a client device. The user may then create a second image group based on a person selected by the user on an image and initiate a second email communication associated with the first image group (e.g., a communication intended for the selected second person and including the second image group), which may also be stored temporarily, and so on. After the user completes the creation of image groups, the user may access her email service to complete and email temporarily stored email communications associated with created image groups.

Figure 4A:
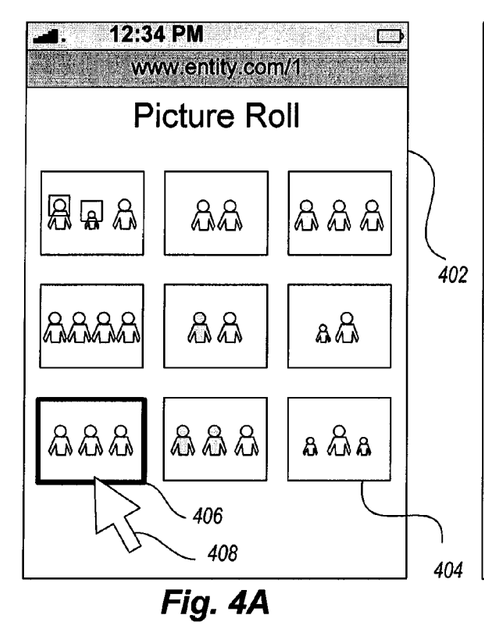
FIGS. 4A, 4B, and 4C illustrate example screenshots of a user interface for grouping images in accordance with an embodiment.
Figure 4B:
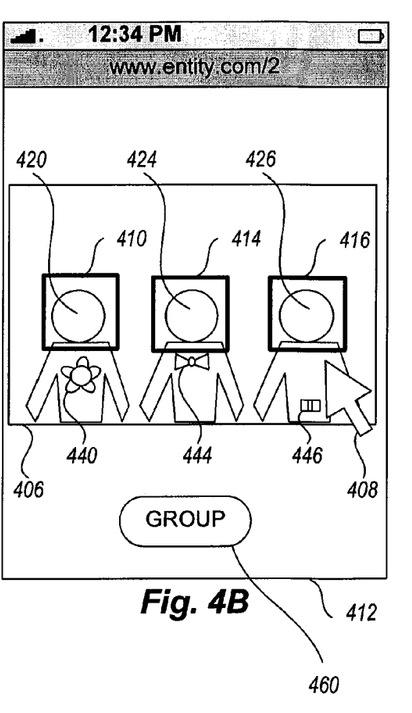
Figure 4C:
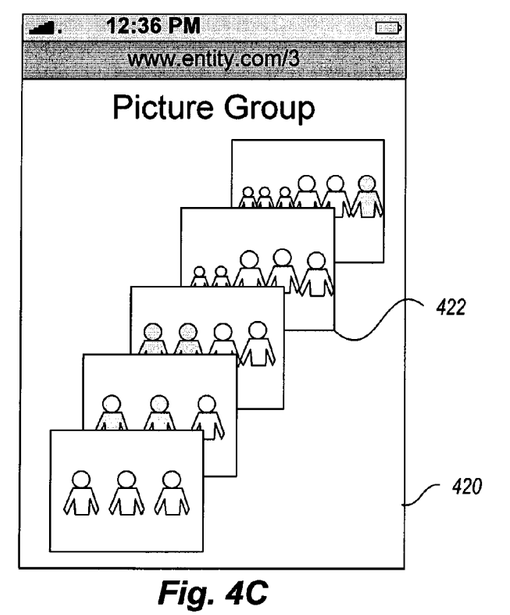

FIGS. 4A, 4B, and 4C illustrate example screenshots of user interfaces provided by the image grouping application for a mobile client device. The screenshots illustrated in FIGS. 4A, 4B, and 4C are shown for illustrative purposes only and should not be interpreted as limiting the scope of the various embodiments. The example user interfaces illustrate one embodiment of a user experience through the process illustrated in FIG. 2.

FIG. 4A illustrates an interface 402 displayed on a client device providing images 404 stored on the client device, remotely or in a combination thereof and accessible by the client device. The images may comprise an event-based group formed as described in reference to FIG. 2. FIG. 4A illustrates that the user selects image 406 using, for example, a cursor 408. A user may select an image 406 in other ways, as described above.

FIG. 4B illustrates that, in one instance, the selected image 406 is displayed to the user on a user interface 412. For illustrative purposes only, the image 406 includes three people. As described in reference to FIG. 2, the image grouping application has recognized that there are three faces in the image 406 and has rendered a selectable bounding box 410, 414, and 416 around each person's 420, 424, and 426 face. Using the cursor 408, the user may select one or more of the faces of the persons as an object of interest by selecting the corresponding bounding box 410, 414, 416.

Upon selecting one or more of the bounding boxes, the user may select the "group" button 460. As described above, the application identifies the characteristics of the selected objects and identifies other images having objects with similar characteristics (either stored locally on the client device remotely or a combination of both).

Any feature-rich areas of the object that are distinct from other portions of the object may be identified as characteristics of the object. For example, the characteristic (distinct feature) of a person 420 may be a flower 440 on her dress, the characteristic (distinct feature) of a person 424 may be a bow tie 444, and the characteristic (distinct feature) of a person 426 may be a belt buckle 446. The images are then associated with a common group identifier (e.g., tag) and displayed as a group. In another example, one initial image of the group may be displayed having a common group identifier (e.g., group title). The user then may select the displayed image and expand the group for display as illustrated in FIG. 4C.

Accordingly, FIG. 4C illustrates an example user interface 420 displaying the images 422 determined to have persons with the same or similar characteristics as the persons selected by the user in FIG. 4B. The images are displayed in FIG. 4C in a tiled fashion. This is for illustrative purposes only and is not meant to limit the scope of the technology described herein. The group of images 422 may be displayed in a clustered group, in which every image includes the objects of interest selected by the user (e.g., persons 524 and 526). In an embodiment, an image group may contain images that have person 524 of the selected 524 and 526, images that have person 526 of the selected 524 and 526, and/or images containing both 524 and 526.

Figure 5A:
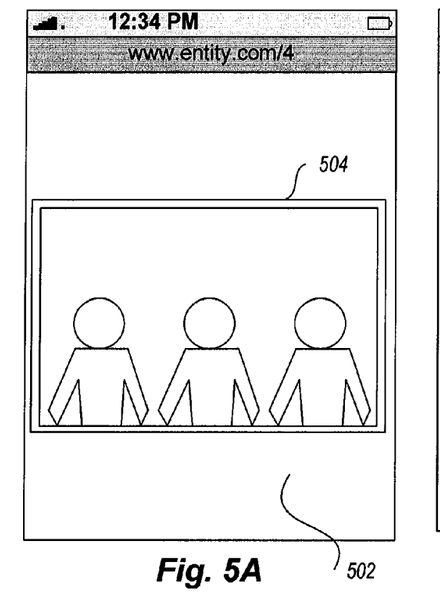
FIGS. 5A, 5B, 5C, and 5D illustrate more example screenshots of a user interface for grouping images in accordance with another embodiment.

FIGS. 5A, 5B, 5C, and 5D illustrate more example screenshots of the image grouping application interfaces displayed to a user on a client device in accordance with an embodiment. The screenshots illustrated in FIGS. 5A, 5B, 5C and 5D are shown for illustrative purposes only and should not be interpreted as limiting the scope of the various embodiments. FIG. 5A includes an interface 502 showing an image 504 of an existing picture captured by the user or displayed to the user in the camera view of the client device. The image 504 may be a representative image of an event-based image group organized as described above in reference to FIGS. 2 and 3. For illustrative purposes, the image 504 includes three people. As described in reference to FIG. 2, the image grouping application has recognized that there are three faces in the image 504 and has rendered a selectable bounding box 530, 534, and 536 around each person's face, as shown on the user interface 506 illustrated in FIG. 5B. The user may select an object of interest (e.g., a face of a person of interest in the image) 508 using, for example, her finger 510 if the client device has a touch sensitive screen. Upon selecting one or more of the bounding boxes 530, 534, 536, the user may select the "call" button 570 or "email" button 580. Other types of actions, e.g., electronic communications associated with the selected image group may also be provided and are not limited to a telephone call associated with the "call" button 570 or email associated with the "email" button 580.

Figure 5B:
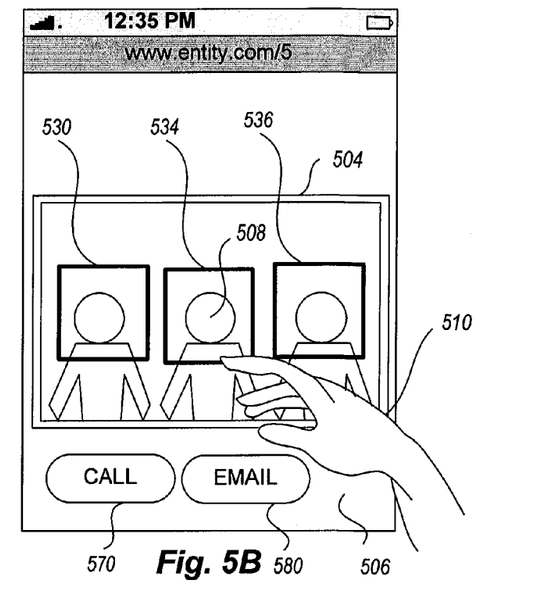

The image grouping application may identify a person by the selected object (face) and associate the identified user with a particular piece of stored user information, for example, the identified user's telephone number. For example, a list of contacts may be shown to the user upon selection of the face 508, and the user may manually link the selected face to the corresponding contact on the list. In another example, the identity of the person with selected face 508 may be determined by matching the selected face to faces of users of social networking resources. If a person is identified, the person's information may be matched to that stored in the user's list of contacts. If the match is found, a particular portion of the identified person's information (e.g., a telephone number or email) may be identified and associated with the person with face 508. The image grouping application may then initiate a telephone call (e.g., when the user selects the button 570) to the telephone number linked to the person whose face 508 was selected by the user. Alternatively, an email communication to the person 508 may be initiated if the user selects the button 580. The email communication associated with the selected image group is described in detail in reference to FIG. 3.

Figure 5C:
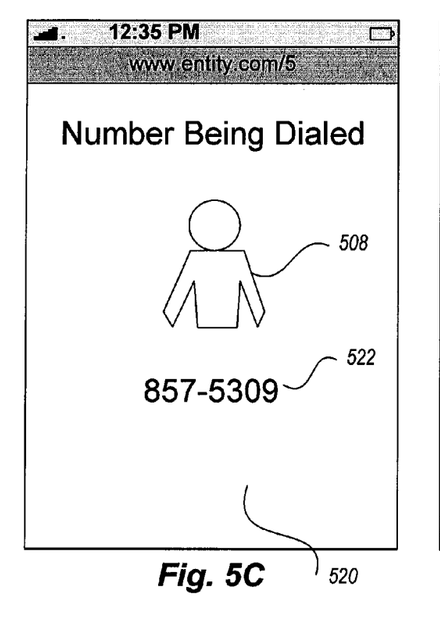
Figure 5D:
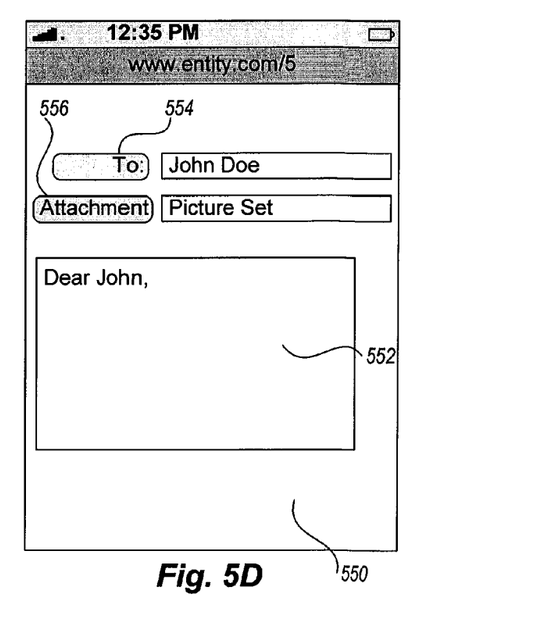

Accordingly, FIG. 5C illustrates a screenshot of the interface 520 showing a person 508 selected by the user as described in reference to FIG. 5B and a corresponding telephone number 522. A telephone call to number 522 may be initiated by the image grouping application in response to the user selection of the "call" button 570. In another example, if a user selected the "email" button 580, an email communication may be initiated. FIG. 5D illustrates a screenshot of the interface 550 showing a "To" line 554 of an email communication 522 populated with an email address of a person 608 selected by the user for the email communication 552 in response to the user selection of the "email" button 580. As described above in reference to FIG. 3, the user may select more than one individual on the image 504 to be added to the "To" line 554. The image group associated with the selected persons may be attached to the email communication 552 as shown by numeral 556 or otherwise associated with the email communication 552.

As discussed above, the various embodiments can be implemented in a wide variety of operating environments which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method comprising:
    grouping, by one or more computer systems configured with executable instructions, and from among a plurality of images, multiple images of the plurality that are associated with a common event into an event-based image group;
    receiving, by the one or more computer systems, a selection by a user of a visual representation of a person;
    identifying, by the one or more computer systems, one or more images in the event-based image group that each includes the person; and
    providing the identified one or more images to the person by sending an electronic communication to the person with information that initiates access to the identified one or more images.

2. The computer-implemented method of claim 1 further comprising, by the one or more computer systems:
    receiving a selection by the user of an action that is associated with at least one image in the event-based image group and that is related to at least one additional person distinct from the person whose visual representation is selected by the user; and
    initiating execution of the action for the at least one image and the at least one additional person.

3. The computer-implemented method of claim 1 wherein the information in the sent electronic communication includes permissions information for one or more network-accessible storage locations that store copies of the identified one or more images, to cause use by the person of the included permissions information in accessing the stored copies.

4. The computer-implemented method of claim 1 further comprising, before the receiving of the selection by the user, associating a selectable element with the visual representation of the person in a first image of the event-based image group; and wherein the receiving of the selection by the user includes detecting an interaction by the user with the selectable element.

5. The computer-implemented method of claim 4 further comprising identifying at least one feature associated with the person in the first image, and wherein the identifying of the one or more images further includes identifying images that each have the identified at least one feature.

6. The computer-implemented method of claim 1 further comprising tagging each of the identified one or more images with a common identifier to associate them together.

7. The computer-implemented method of claim 6 further comprising, after the tagging, receiving a selection by the user of the common identifier, and providing the tagged images to the user in response to the selection by the user of the common identifier.

8. The computer-implemented method of claim 1 further comprising determining, by the one or more computer systems, contact information for the person by at least one of automatically retrieving stored information associated with the person or receiving the contact information from the user, and wherein the sending of the electronic communication to the person is performed by the one or more computer systems and includes using the determined contact information and adding the identified one or more images to the electronic communication as part of the information that initiates access.

9. The computer-implemented method of claim 1 wherein the grouping of the multiple images includes determining the common event based on at least one of a first determined period of time within which the multiple images were captured, or a determined location at which the multiple images were captured.

10. The computer-implemented method of claim 1 further comprising receiving instructions from the user to provide the person with access to the identified one or more images, and wherein the providing of the identified one or more images to the person is performed in response to the instructions from the user.

11. The computer-implemented method of claim 1 further comprising automatically determining, by the one or more computer systems, to provide the person with access to the identified one or more images, and wherein the providing of the identified one or more images to the person is performed in response to the automatic determining.

12. A computer system comprising:
    at least one processor; and
    at least one memory having computer-executable instructions that, when executed on the at least one processor, cause the at least one processor to:
        group, from among a plurality of images, multiple images of the plurality that are associated with a common event;
        analyze the multiple images to identify images that each includes a person; and
        provide the person with access to the identified images by using determined contact information for the person.

13. The computer system of claim 12 wherein the computer-executable instructions further cause the at least one processor to receive one or more selections by a user that are associated with at least one of the identified images or of the person, and wherein the providing of the person with the access to the identified images is performed based at least in part on the one or more selections by the user.

14. The computer system of claim 12 wherein the computer-executable instructions further cause the at least one processor to determine to provide the person with access to the identified images, and wherein the providing of the person with the access to the identified images is performed based at least in part on the determining.

15. The computer system of claim 12 wherein the computer-executable instructions further cause the at least one processor to receive a selection by a user of a visual representation of the person in a first image, and wherein at least one of the analyzing of the multiple images or of the providing of the person with the access is based at least in part on the received selection.

16. A non-transitory computer-readable medium having computer-executable instructions stored thereon that, when executed by a computer, cause the computer to:
- group, by the computer and from among a plurality of images, multiple images of the plurality that are associated with a common event;
- identify, by the computer, one or more images of the multiple images that each includes a person, wherein the identifying includes analyzing faces in at least one of the identified one or more images; and
- provide, to the person, access to the identified one or more images by sending one or more electronic communications to the person.

17. The non-transitory computer-readable medium of claim 16 wherein the computer-executable instructions further cause the computer to store the identified one or more images in a data store accessible by client devices over one or more computer networks, and wherein the sending of the one or more electronic communications includes providing, in the sent one or more electronic communications for the data store, permissions information for use in accessing the stored identified one or more images.

18. The non-transitory computer-readable medium of claim 16 wherein the computer-executable instructions further cause the computer to provide the access to the identified one or more images by including the identified one or more images in the sent one or more electronic communications.

19. The non-transitory computer-readable medium of claim 16 wherein the identifying of the one or more images that each includes a person and the providing of the identified images to that person is performed for each of multiple people present in the multiple images associated with the common event.

20. The non-transitory computer-readable medium of claim 16 wherein the computer-executable instructions further cause the computer to receive a selection by a user of the person, and wherein at least one of the identifying of the one or more images and of the providing of the access is based at least in part on the received selection.

* * * * *

UNITED STATES PATENT AND TRADEMARK OFFICE
CERTIFICATE OF CORRECTION

PATENT NO. : 9,619,713 B2  
APPLICATION NO. : 14/986399  
DATED : April 11, 2017  
INVENTOR(S) : Matthew W. Amacker et al.

Page 1 of 1

It is certified that error appears in the above-identified patent and that said Letters Patent is hereby corrected as shown below:

On the Title Page

Item (73):  
"A9.com, Inc, Palo Alto, CA (US); Amazon Technologies, Inc., Reno, NV (US)"

Should read:  
--A9.com, Inc., Palo Alto, CA (US); Amazon Technologies, Inc., Reno, NV (US)--.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*